(12) United States Patent
Kramarenko et al.

(10) Patent No.: US 12,439,844 B2
(45) Date of Patent: Oct. 14, 2025

(54) SMART FERTILIZER DELIVERY SYSTEM

(71) Applicant: PSIMOS, Inc, New York, NY (US)

(72) Inventors: Aleksei Valentinovich Kramarenko, Chuvashiya (RU); Dmitry Mikhaylovich Mikhaylov, Moscow (RU); Alexey Sergeevich Pronichkin, Uliyanovskaya obl. (RU); Sergey Valerievich Bagrov, Moscow (RU); Natalya Mikhaylovna Zolotykh, Moscow (RU); Ilman Shazhaev, Moscow (RU)

(73) Assignee: PSIMOS, INC., New York, NY (US)

( * ) Notice: Subject to any disclaimer, the term of this patent is extended or adjusted under 35 U.S.C. 154(b) by 464 days.

(21) Appl. No.: 17/380,953

(22) Filed: Jul. 20, 2021

(65) Prior Publication Data

US 2022/0015287 A1    Jan. 20, 2022

Related U.S. Application Data

(60) Provisional application No. 63/053,837, filed on Jul. 20, 2020.

(51) Int. Cl.
*A01C 23/04* (2006.01)
*A01C 21/00* (2006.01)
(Continued)

(52) U.S. Cl.
CPC .......... *A01C 23/042* (2013.01); *A01C 21/007* (2013.01); *A01C 23/007* (2013.01);
(Continued)

(58) Field of Classification Search
CPC ... A01C 23/042; A01C 23/007; A01C 21/007; G01N 33/24; G01N 2033/245;
(Continued)

(56) References Cited

U.S. PATENT DOCUMENTS

| | | | | |
|---|---|---|---|---|
| 4,992,942 | A | * | 2/1991 | Bauerle .................. A01G 31/00 706/930 |
| 5,184,420 | A | * | 2/1993 | Papadopoulos ........ A01G 31/00 47/62 N |

(Continued)

OTHER PUBLICATIONS

International Search Report and Written Opinion dated Nov. 2, 2021 which was issued in connection with PCT/US21/42400.

*Primary Examiner* — Kamini S Shah
*Assistant Examiner* — Mohammed Shafayet
(74) *Attorney, Agent, or Firm* — Buckley, Maschoff & Talwalkar LLC

(57) ABSTRACT

Systems, methods, apparatus and computer program code are provided deliver fertilizer to targeted areas. In some embodiments, a system includes a memory configured to store data associated with an area to be fertilized, the data including information identifying a crop and soil analysis data associated with the area and a processor configured to receive sensor data associated with the area, the sensor data including information identifying a current weather condition and a current soil condition, automatically generate a proposed recipe of a fertilizer mixture, the recipe including information identifying a combination of elements and a dosage of each element, determining whether the proposed recipe satisfies at least a first rule; and operating a delivery system to deliver the fertilizer mixture to the area.

12 Claims, 8 Drawing Sheets

(51) Int. Cl.
*A01C 23/00* (2006.01)
*G01N 33/24* (2006.01)
*G05B 13/02* (2006.01)
*G06Q 50/02* (2024.01)

(52) U.S. Cl.
CPC ........... *G01N 33/24* (2013.01); *G05B 13/028* (2013.01); *G06Q 50/02* (2013.01); *G01N 33/245* (2024.05); *G05B 2219/25297* (2013.01)

(58) Field of Classification Search
CPC ..... G01N 33/245; G01W 1/00; G05B 13/028; G05B 2219/25297; G05B 13/027; G06Q 10/06313; G06Q 50/02; A01G 25/167
See application file for complete search history.

(56) References Cited

U.S. PATENT DOCUMENTS

| | | | |
|---|---|---|---|
| 2002/0183935 A1* | 12/2002 | Skinner | A01G 25/02 239/93 |
| 2010/0332039 A1* | 12/2010 | Danieli | A01C 21/007 73/64.48 |
| 2014/0012732 A1* | 1/2014 | Lindores | A01B 79/005 705/37 |
| 2016/0003790 A1 | 1/2016 | Osborne et al. | |
| 2016/0148104 A1 | 5/2016 | Itzhaky et al. | |
| 2016/0180473 A1 | 6/2016 | Groeneveld | |
| 2018/0156767 A1 | 6/2018 | Osborne et al. | |
| 2021/0227761 A1* | 7/2021 | Redman | B05B 9/0416 |

* cited by examiner

| Soil Conditions affecting the non-assimilation of elements (AT2020) | | | | | |
|---|---|---|---|---|---|
| Condition | Non-assimilating elements | | | | |
| Cold soil | N | P | S | Fe | Zn |
| Overmoistened soil | N | P | K | Fe | Zn |
| High pH (alkaline) | Cu | Fe | Mn | Zn | |
| Low pH (acidic) | S | Ca | Mg | Mo | |
| Compacted soil | P | K | Mg | | |
| Dry soil | P | K | S | B | |
| Sandy soil | S | Mg | K | B | Mn |
| High calcium content | P | Fe | | | |
| Low level of organic matter | S | K | P | B | Zn |
| Very high level of organic matter | K | Cu | Mn | | |

*FIG. 6*

| Fertilizers | 1 | 2 | 3 | 4 | 5 | 6 | 7 | 8 | 9 | 10 | 11 | 12 |
|---|---|---|---|---|---|---|---|---|---|---|---|---|
| 1 | Y | Y | M | N | Y | M | M | M | N | M | N | N |
| 2 | Y | Y | Y | N | M | M | M | M | N | M | N | N |
| 3 | M | Y | Y | N | M | M | M | M | N | M | N | N |
| 4 | N | N | Y | Y | M | M | M | M | M | M | M | N |
| 5 | Y | M | M | M | Y | Y | M | M | M | M | M | M |
| 6 | M | M | M | N | Y | Y | M | M | N | M | N | Y |
| 7 | M | M | M | M | M | M | Y | M | M | M | N | Y |
| 8 | M | M | M | M | M | M | M | Y | M | M | N | N |
| 9 | N | N | M | Y | M | N | M | M | Y | M | Y | N |
| 10 | Y | M | M | M | M | M | M | M | M | Y | M | N |
| 11 | N | N | M | Y | M | N | N | N | M | M | Y | N |
| 12 | N | N | N | N | M | Y | Y | N | N | Y | N | Y |

Legend

| | |
|---|---|
| Y | Yes, the combination can be mixed |
| N | No, the combination cannot be mixed |
| M | Maybe, the combination can be mixed under certain conditions |
| 1 | Ammonium sulfate, ammophos, diammophos |
| 2 | Nitrophos, ammonium nitrate |
| 3 | Sodium, calcium and potassium nitrate |
| 4 | Cyanamide calcium |
| 5 | Carbamide |
| 6 | Superphosphate |
| 7 | Phosphate flour and bone flour |
| 8 | Precipitate |
| 9 | Tomas slag, phosphate slag |
| 10 | Potassium salt and potassium chloride |
| 11 | Lime, salt |
| 12 | Manure |

*FIG. 7*

SMART FERTILIZER DELIVERY SYSTEM

RELATED APPLICATIONS

This application is based on, and claims benefit of and priority to, U.S. Provisional Patent Application Ser. No. 63/053,837 filed on Jul. 20, 2020, the contents of which are hereby incorporated by reference in their entirety for all purposes.

BACKGROUND

Crop yields are improved by proper fertilization. Unfortunately, variations in fields and environmental conditions can make it difficult to achieve targeted results without prohibitive labor and operational costs. It would therefore be desirable to provide systems and methods to facilitate targeted, timely, and differentiated application of nutrients in an automatic and accurate manner.

BRIEF DESCRIPTION OF THE DRAWINGS

FIG. 6 is an illustration of a portion of a data table pursuant to some embodiments.

FIG. 7 is an illustration of a portion of a data table pursuant to some embodiments.

DETAILED DESCRIPTION

Figure 1:
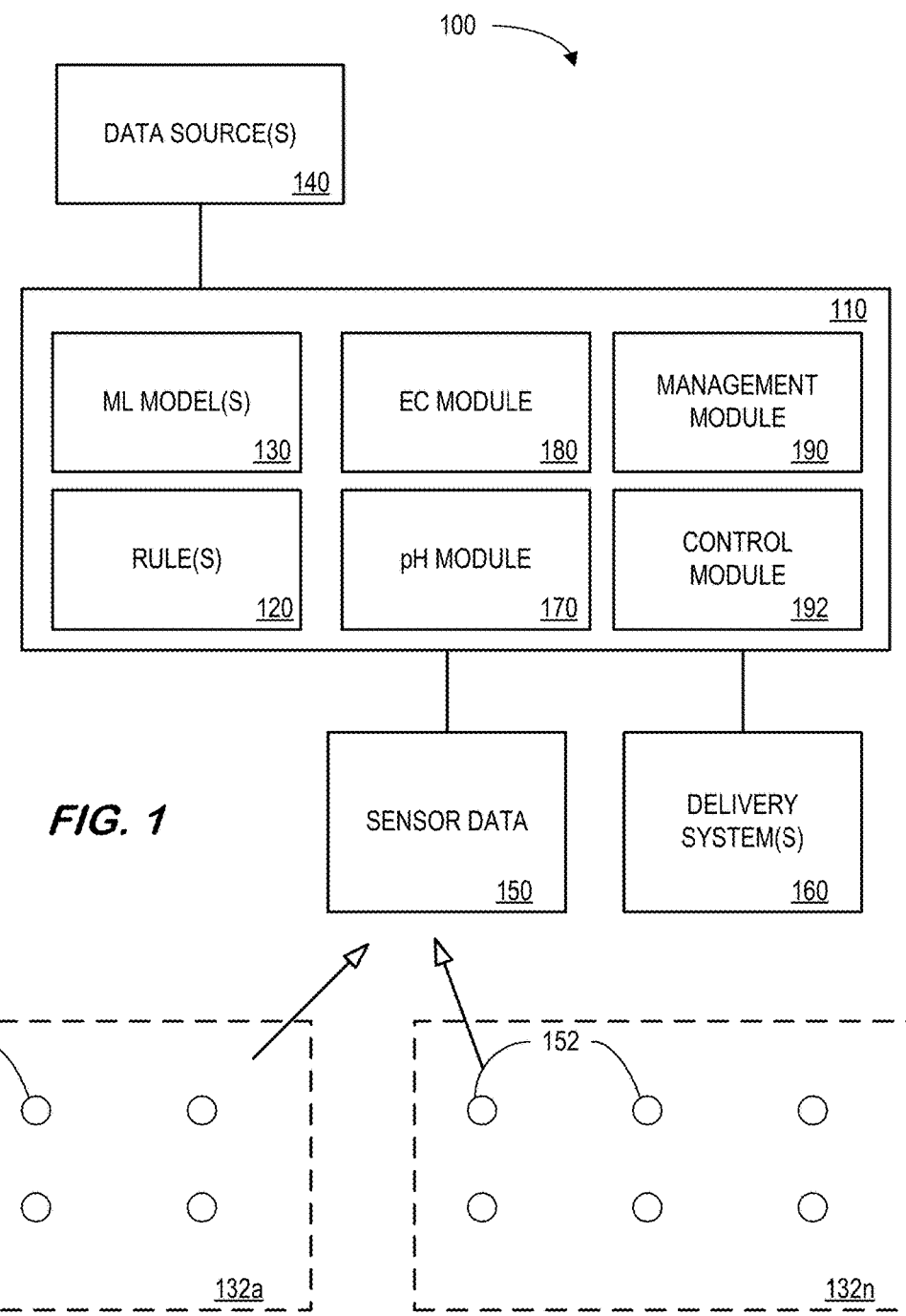
FIG. 1 is a block diagram of portions of a system that may be provided pursuant to some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

Embodiments provide a technological solution to problems associated with fertilization of crops and plantings. Embodiments utilize a machine learning model that may be used to predict attributes or outcomes associated with a physical environment such as one or more fields or other areas to be fertilized. Data for training and operating the model may be obtained from a number of sensors including, for example, sensors in or associated with the field or area to be fertilized (such as sensors detecting or measuring humidity, acidity, or other information characterizing the sufficiency or insufficiency of a nutrient or the like). Data may also be obtained from one or more external data sources such as weather services, or the like. The machine learning model operates in conjunction with one or more models or rules based systems to control the operation of one or more delivery systems which act to cause the appropriate fertilizer to be delivered to each portion of the physical environment.

Systems, methods, apparatus and computer program code are provided to deliver fertilizer to targeted areas. In some embodiments, a system includes a memory configured to store data associated with an area to be fertilized, the data including information identifying a crop and soil analysis data associated with the area and a processor configured to receive sensor data associated with the area, the sensor data including information identifying a current weather condition and a current soil condition, automatically generate a proposed recipe of a fertilizer mixture, the recipe including information identifying a combination of elements and a dosage of each element, determining whether the proposed recipe satisfies at least a first rule; and operating a delivery system to deliver the fertilizer mixture to the area.

The main direction of scientific and technical progress in the technology of fertilization is to reduce labor costs for all operations related to the use of mineral and other fertilizers in agriculture, as well as existing errors in decision-making, as a result of obtaining inaccurate data in the process of monitoring and analysis associated with the processing of large amounts of information. This requirement must be combined with getting the maximum return on the crop from applying each kilogram of fertilizer. This can be done with the help of advanced methods in the application of fertilizers in agrotechnics. One of these methods is to apply concentrated fertilizers in a mixture with irrigation water point-to-point, in a certain area of the field that needs it. The possibility of timely, differentiated and accurate application of nutrients, in accordance with their uneven distribution in the soil, is a possibility to manage the processes of fertility and forecast crop yields.

A mixture is a mechanical compound of fertilizers that contains two or more nutrients in its composition.

When using mixtures of fertilizers, the costs of their application are reduced, and the resulting agronomic effect is equal to separate application.

Studies show that when applying fertilizers with irrigation water, you can get higher yields of agricultural crops than when applying the same doses of fertilizers separately and the same irrigation rates. This type of top dressing makes it possible to prepare mixtures of different composition and concentration. Combining the application of mineral fertilizers, organic fertilizers, biofertilizers based on bacterial strains, as a result of discrete and dosed irrigation allows you to achieve fractional nutrition for plants depending on the period of their growth and development.

Due to their ultra-small size, dissolved substances move quickly in the soil or substrate or in the aquaponic environment and are quickly and completely absorbed by the active root part of plants. Proper delivery and selection of such substances allows adjustment of the diet during the entire period of growth and development of plants, regardless of the size and condition of the row spacing.

Embodiments use a targeted approach to fertilization, where a specific mixture is determined for application to a specific area taking many parameters are taken into account: soil quality, crop characteristics, weather characteristics, historical data, etc. Embodiments avoid the use of processes that lead to salinization of the soil or substrate and loss of nutrients, such as the release of ammonia, or the transition of nutrients to a hard-to-reach form that impairs digestibility. Pursuant to some embodiments, immunomodulators and soil remediators may be used (these are organic compounds of amino acids in ultra-small doses, bacterial strains, that may function to strengthen the stress resistance of plants and improve the overall condition of the soil and its fertility). The multivariance of a set of amino acids is determined by a variety of parameters, including the current phase of plant development, plant depression, soil type, and others.

Pursuant to some embodiments, the system uses a large amount of data from various sensors such as temperature, humidity, chemical composition, acidity, etc. The system also uses information associated with a large number of chemical and organic compounds used in fertilizers, a large number of different compatibility restrictions, as well as the factor of constant crop monitoring and crop stress monitoring, allows you to effectively use the advantages of this system, which uses machine learning technology to optimize the management system for automated application of fertilizer mixtures to the soil.

FIG. 1 is a high-level architecture of a system 100 in accordance with some embodiments. The system 100 includes a control platform 110 that receives data from one or more data sources 140 (such as, for example, soil data, weather data, crop data) and one or more sensor data sources 150 (which may be associated with sensors at one or more physical environments such as a field or other area to be fertilized 132a, 132n). The sensor data 150 and the data source data 140 are provided as inputs to a number of software components or modules, including one or more machine learning model(s) 130, crop or fertilizer rules 120, a pH module 170, a conductivity (or "EC") module 180, a management module 190 and a control module 192. These components operate on the data from the data sources 140 and the sensor data 150 to produce control signals that control the operation of one or more delivery systems 160 which act to mix and deliver fertilizer, water and other nutrients to the physical environments 132a, 132n. The physical environments 132a, 132n may be fields or greenhouses or hydroponic or aquaponic growing areas.

One or more machine learning model(s) 130 may be associated with each of the physical environments 132a, 132n. For example, in some embodiments, each physical environment 132a, 132n (such as, for example a specific greenhouse, a specific row in a greenhouse, a specific field, or a specific row or area of the field) may, according to some embodiments, be associated with a machine learning model 130 that is configured to predict outputs associated with that specific physical environment based on historical data associated with that specific physical environment as well as current data associated with that specific physical environment. Pursuant to some embodiments, the machine learning model(s) 130 may be trained to predict an optimized flow rate of a mixture of fertilizer with water such that the concentration of the fertilizer and water is controlled to achieve a desired result. Applicants have determined that the selection of an optimal flow rate of water to control the concentration of fertilizer is not suited for a mathematical model or a rules-based system and that a machine learning model trained on historical data achieves desirable results.

In some embodiments, the pH module 170 is configured to perform pH monitoring and to calculate the delivery and formulation of the proper amount of alkali/acid to the fertilizer solution. The pH module 170 may rely on data associated with acid and alkali consumption of the crop, information about the pH of a proposed fertilizer solution (e.g., expressed as the negative logarithm of the concentration of hydrogen ions), and information about any change in the pH of a solution over time (e.g., as a change in the negative logarithm of the concentration of hydrogen ions). The EC module 180 is configured to regulate the ratio of mineral fertilizers to irrigation water by controlling the injection of the fertilizers into the water source. The management module 190 performs tasks such as reading sensor metrics from a library and adjusting the operation of the system 100. The control module 192 operates to issue control signals to the delivery systems 160 to ensure that the correct mixture is created and is delivered to the proper area and with the proper flow rate.

Pursuant to some embodiments rules 120 may be provided to perform certain calculations or tasks associated with the operation of the system 100. For example, rules 120 may be provided to calculate the acid/alkali balance of a composition given current soil and crop conditions at a physical environment 132. As another example, rules 120 may be provided to calculate a desired mixture of "NPK" (Nitrogen, Phosphorous, and Potassium or Potash).

Pursuant to some embodiments, the dose of nitrogen fertilizers may be determined using the following mathematical model: $N_{ду} = A_N * П_{yp} * N_{min} * (1 - N_{max} * П_y) * A_П K + (Гy_{M_o} - Гy_M)/0.5) * 10 - AP_1 * ПP_{yp2} + AP_2 * ПP_y + AP_3 * N_\% * N K_П / 100 - N_1 * A_B K + N_2 * A_{oПp} - A_{нб}$ In the formula, the following variables are used: (i) $A_П K$—correction factor for soil nitrogen accounting; (ii) $A_{нб}$—correction to the dose of nitrogen fertilizers; (iii) $A_N$—standard removal of nitrogen from 1 ton; (iv) $N_{min}$ и $N_{max}$—coefficients of the model that specify the maximum and minimum percentage of return of nitrogen removal with the crop; (v) $П_{yp}$—planned crop yield, t/ha; (vi) $Гy_M$—humus content in the soil (%); (vii) $Гy_{M_o}$—optimal value depending on the type of mineral soil; (viii) $N_\%$—percentage of N in dry plant residues; (ix) $N K_П$—correction factor, depending on the type of soil; (x) $AP_1, AP_2, AP_3$—coefficients of the regression equation for converting the yield of the precursor to the mass of plant residues, in kg/ha; (xi) $ПP_y$—yield of the predecessor, t/ha; (xii) $A_B K$ и $A_{oПp}$—the dose of organic fertilizers, t/ha for the cultivated crop and its predecessor, respectively; and (xiii) $N_1$ и $N_2$—nitrogen utilization rates, kg of feedstock per ton of fertilizer, in the first and second year of application.

For calculating the dose of phosphorus fertilizers, the following model is proposed:

$P_{ду} = P_N * П_{yp} * Ф_1 * (1 - Ф_2 * y_2 / y_{max}) * (1 - Ф_3 * [P_2O_5])$
$* P_{pH} * P_П K_{-P.O.} * P_\% * P K_П / 100 - P_{Пp} * 0.165 -$
$(P_1 * Ф_B K + P_2 * Ф_{oПp})$ The notations for the above phosphorus fertilizer formula include: (i) $P_{pH}$—correction to the dose of phosphorous fertilizers, depending on the degree of soil acidity; (e.g., $P_{pH} = 1.2$ при pH$_{KCL} < 5.0$; $P_{pH} = 1.1$ при $5.1 < $pH$_{KCL} < 5.5$ и $P_{pH} = 1.0$ при pH$_{KCL} > 5.6$); (ii) $P_П K$—a correction factor that allows you to take into account the type and composition of the soil for phosphorus; (iii) $P_N$—standard removal of phosphorus with 1 ton of the main and the corresponding amount of by-products; (iv) $П_{yp}$—planned crop yield, t/ha; (v) yp$_{max}$ (yp$_2$)—the maximum yield of the crop (on sod-podzolic loamy and sandy loam soils on the moraine of the yp$_{max} = Y_1$, and on sod-podzolic sandy loam and sandy on sand and peat-bog soils of the yp$_{max}$=yp$_2$); (vi) $Ф_1, Ф_2$ и $Ф_3$—coefficients of the model; (vii) P.O.—plant residues of the precursor in kg/ha; (viii) $P_\%$—percentage of phosphorus in absolutely dry plant residues; (ix) $P K_П$—coefficient that depends on the type of soil; (x) $P_{Пp}$—dose of phosphorous fertilizers; (xi) $Ф_B K$ и $Ф_{oПp}$—the dose of organic fertilizers, t/ha for the cultivated crop and its predecessor, respectively; and (xii) $P_1$ и $P_2$—phosphorus utilization rates, kg of organic matter per ton of fertilizer, in the first and second year of organic fertilizer use, respectively.

The following mathematical model is used with embodiments of the present invention to calculate the dose of potash fertilizers:

$$K_{ду} = K_N * П_{ур} * K_1 * (1 - K_2 * П_{ур}/yp_{max}) * (1 - K_3 * [K_2O]) * K_{pH} * K_{пк} - P.O. * K_{\%} * K_{кп}/100 - K_{пр} * 0.125 - K_{01} * K_B K_+ K_{02} * K_{oпр},$$

Where the notation for the above formula is as follows: (i) $K_{pH}$—correction to the dose of potash fertilizers, depending on the degree of soil acidity ($K_{pH}=1.0$ при $pH_{KCL}<5.5$; $K_{pH}=1.1$ при $5.5<pH_{KCL}<=6.0$ и $K_{pH}=1.2$ при $pH_{KCL}>6.0$); (ii) $K_п K$—a correction factor that allows you to take into account the type and granulometric composition of the soil for potassium; (iii) $K_N$—standard removal of potash with 1 ton of the main and the corresponding amount of by-products; (iv) $П_{ур}$—planned crop yield, t/ha; (v) $yp_{max}$—maximum crop yield $K_1$, $K_2$ и $K_3$—model coefficients: $K_1$, $K_2$. $[K_2O]$—content of mobile forms of potassium, mg/kg of soil; (vi) P.O.—plant residues of the precursor in kg/ha; (vii) $K_{\%}$—the percentage of potassium in absolutely dry plant residues; (viii) $K$ $K_п$—coefficient that depends on the type of soil; (ix) $K_{пр}$—the dose of potash fertilizers applied under the predecessor; (x) $K_B K$ и $K_{oпр}$—the dose of organic fertilizers, t/ha for the cultivated crop and its predecessor, respectively; and (xi) $K_{01}$ и $K_{02}$—potash utilization rates, kg of mineral water per ton of fertilizer, in the first and second year of application, respectively.

Pursuant to some embodiments, it is also necessary to calculate the optimal rate of supply of water to control the concentration of the resulting fertilizer/water mixture when delivered to the target area. The concentration of water is based on its electrical conductivity. To adjust the concentration of water, it is necessary to increase or decrease the electrical conductivity by changing the speed of supply as follows.

$V_H$=max ($V_1$, $V_2$, $V_3$), where $V_H$—the time it takes to fill the tank and mix fertilizers and $V_1$, $V_2$, $V_3$—values of the time it takes for fertilizers to be delivered from the mixing tanks.

$v_{pH}=V_u+V_o$, where $v_и$—operating time of the indicator for determining the pH value of the solution, $v_o$—the time it takes for the signal to be transmitted to the complex module.

$V_\mu$—the time it takes to prepare the solution and with the mass M $$M_i = \sum_{i=1}^{3} M_i + M_{c/o}$$

$M_i$—weight i-th fertilizer solution in the mixing tank, $M_{c/o}$—mass of the solution.

At the same time $V_\mu = V_H + V_{pH} + V_{c/o}$,

Where $V_{c/o}$—this is the time when the solution is delivered to the mixing tank.

The control platform 110 may include one or more microcontrollers or other computer systems (such as a computer server) which are configured to provide a computing environment in which one or more software or control applications (such as items 120, 130, 170, 180 and 190) may be executed to perform the processing described herein. According to various embodiments described herein, the control platform 110 may be implemented as a server. In some embodiments, the control platform 110 may configured using any of a number of well-known computing systems, environments, and/or configurations such as, but not limited to, microcontrollers, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like.

These applications, modules or components (as well as other components or flows described herein) may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art. A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components.

The rules 120, the machine learning models 130 and the other modules 170, 180, and 190 may function together to generate control signals to operate the system 100 such that a desired fertilizer mixture is substantially automatically created and delivered to a physical environment 132.

As used herein, the term "automatically" may refer to, for example, actions that can be performed with little or no human intervention. The machine learning model 130 of a physical environment (such as a field area) is generally created based on data from sensors and probes, historical data, reference data on soils, water environment and crops. Data is collected using several sensors and probes that constantly update the current state of a given field area and all its components such as soil or water, plants, weather conditions, etc. In some embodiments, the model uses numerous digital reference data associated with crops, soils and fertilizers for mixtures.

Pursuant to some embodiments, the models will be used for training a neural network with reinforcement. The neural network may be created on the basis of the open software library TensorFlow with the introduction of proprietary models and weight indicators. The state predicted by the models may be compared with the actual physical environment and any resulting discrepancies may be used for training the neural network.

Sensors and probes located in a field of soil or water environment, can be buried in or installed on the surface, or above the surface, and can be configured to transmit to the onboard computer a signal about the indicator that characterizes the sufficiency or insufficiency of a parameter, such as the amount of certain nutrients or substances, humidity, acidity (pH). In the case of nutrient deficiencies in the soil or water, or changes in the pH value, the received signal from the sensor, sensor or probe is fed to the onboard computer system, which, based on the analysis of information and interaction with the neural network and historical data, outputs data on the exact and necessary number of missing elements from a specific area of the field, and then sends a signal to open the gateway of a specific replaceable and refillable containers—cartridges, or several replaceable and refillable containers—cartridges to make an accurate dosage of fertilizers, mixing them with irrigation water until a homogeneous mixture is obtained and delivering them to a specific location.

Pursuant to some embodiments, the machine learning model 130 and the rules 120 operate to determine the optimum composition of the mixture by taking into account key parameters of mixing, including: the volume of the mixer selected for the device, manual calculations and multiple types of mixtures, historical data, mixing the mixtures, cost characteristics of components of the mixtures. In some embodiments, the reference composition of standard minerals and their compatibility is updated.

Pursuant to some embodiments, the delivery systems 160 are automatically controlled for point application and dosing of the prepared mixture in the selected field section. In some embodiments, the system 100 may also operate to notify a user about the operations being performed.

Pursuant to some embodiments, probes and sensors 152 are used for rapid measurement or monitoring in the online system of the state of the soil or water environment of a field site, such as ambient temperature; air humidity; redox potential of the soil; sensors as probes buried in the soil and determining the active value of soil elements $Na+$, $K+$, $Ca2+$, $Cl-$, $NO3-$, $Mg2+$; sensors determining the strength of solar radiation or radiation, or the strength of light radiation from artificial lighting.

Pursuant to some embodiments, the system 100 may additionally include basic measuring units, such as IOT sensors; a soil temperature sensor of the field site as a probe; an IR sensor; an ultraviolet sensor; a sensor of the surface temperature of the soil of the field site; a soil moisture sensor of the field site with the functions of conductivity, volume content and potential of soil water and giving readings using subsurface probes with electrodes; a sensor that determines the redox potential of the finished homogeneous mixture for irrigation; portable weather station that detects precipitation, wind speed and direction, and atmospheric pressure.

Pursuant to some embodiments, probes and sensors 152 may be provided with communication capability to transmit signals to the onboard computer in the operational mode. In some embodiments, the probes and sensors 152 may be provided with photocells with storage devices for uninterrupted signal transmission.

Figure 2:
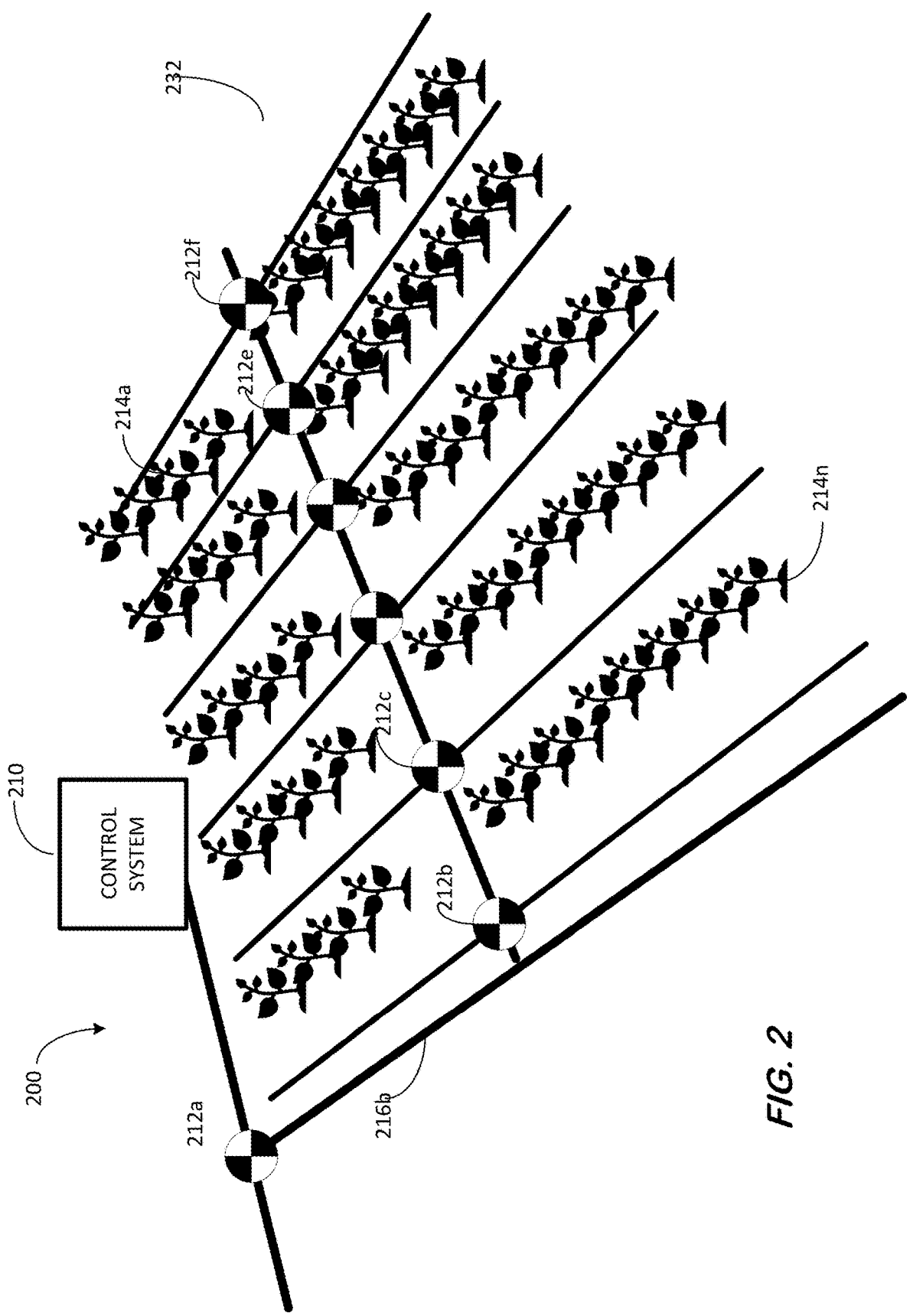
FIG. 2 is a view of a fertilization and irrigation system pursuant to some embodiments.

Reference is now made to FIG. 2 which depicts portions of a fertilization and irrigation system 200 pursuant to some embodiments. As used herein, the term "fertigation" may be used to refer to a system that includes a control system 210 that controls the delivery of selected proportions of fertilizer as well as irrigation to one or more plants 214 in one or more physical areas 232 (such as fields, hydroponic systems or the like). The control system 210 operates in conjunction with a network of pipes 216a-n (such as pipes, hoses, canals or other irrigation components) and a network of control valves 212a-n to selectively deliver an appropriate amount of fertilizer and water to individual areas of the physical area 232. For example, in a given field, the field may have different areas with different soil compositions. Embodiments allow appropriate doses and combinations of fertilizer to be mixed as needed for delivery to those different areas.

In the embodiment depicted in FIG. 2, for example, the plants 214a may be in an area having a different soil composition than the plants 214n in a different area. The control system 210 may deliver a first configuration of fertilizer and water to the plants 214n by, for example, selectively controlling valves 212b and 212c. The control system 210 may deliver a second configuration of fertilizer and water to the plants 214a by, for example, selectively controlling valves 212e and 212f.

While only a few rows of plants 214 are depicted in FIG. 2, in practical application, a physical area 232 may be large with a large number of rows of plants 214. Embodiments may be used with desirable results in conjunction with large growing environments as well as smaller environments such as smaller greenhouses or fields.

Figure 3:
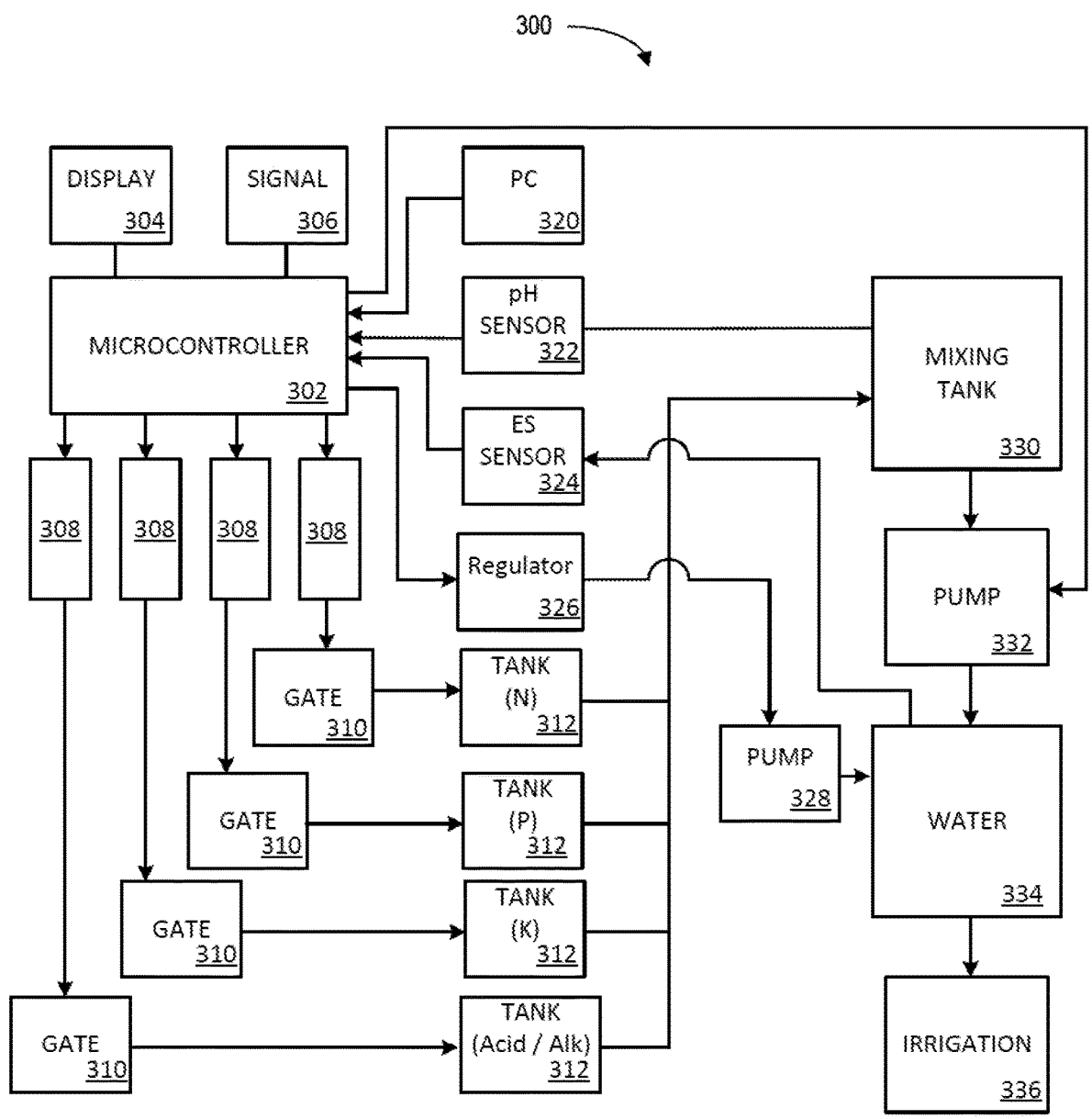
FIG. 3 is a block diagram depicting components of a control system pursuant to some embodiments.

The control system 210 of FIG. 2 may include the a server system configured as the platform 110 of FIG. 1 as well as other components such as those which will now be described in conjunction with FIG. 3 which is a block diagram depicting some components of a control system 300 pursuant to some embodiments. The configuration of each control system 300 may vary in different use cases (for example, different combinations of sensors may be provided or the like), and the particular configuration depicted in FIG. 3 is provided for illustrative but not limiting purposes.

Control system 300 may include a number of components configured to automatically determine the appropriate mixture of fertilizer for application to a given area as well as to automatically deliver the fertilizer to the area via an irrigation system. The control system 300 may include one or more microcontrollers 302 (and associated memory, storage and networking devices to allow the microcontroller 302 to operate as described herein). Users may interact with the microcontroller 302 via one or more display devices 304 (which may also include one or more data entry or input devices not shown in FIG. 3). The microcontroller 302 is configured to receive data from a number of different input sources including a number of sensors 322, 324 as well as one or more remote server devices 320. The sensors 322, 324 may include any of a number of types of sensors configured to obtain data associated with a field or area to be fertilized.

For example, in some embodiments, a number of sensors 322, 324 may be deployed in conjunction with a field or area to be fertilized. The sensors 322, 324 may preferably be digital sensors that communicate data over a wired or wireless connection to the microcontroller 302 (and/or to one or more server devices 320), although analog sensors may also be used in some embodiments. The system 300 may include sensors to measure soil acidity (expressed in pH) and referred to as a pH sensor 322. The system 300 may also include sensors to measure the electrical conductivity of soil. Such sensors are generally referred to as electrical conductivity (or "EC") sensors and may include two electrodes placed opposite each other. An alternating voltage is applied to the electrodes, causing cations to move to the negatively charged electrode while anions move to the positive electrode. The more free electrolyte, the higher the conductivity. In some embodiments, the system 300 may also include sensors to measure the moisture in the soil. A soil moisture sensor may be used to determine the amount of moisture in the soil. Other humidity sensors may be used to measure the humidity in the air. In some embodiments, the system 300 may also include sensors to measure the quality of the air. For example, an air quality sensor may be deployed at a field or area to be fertilized to measure the amount of carbon dioxide, carbon monoxide, ammonia, benzine, nitric oxide, alcohol vapor, or other elements in the air that may affect the efficacy of the fertilizer. In some embodiments, the system 300 may also include temperature sensors to measure the current soil temperature (as well as sensors to measure the air temperature).

Pursuant to some embodiments, sensors may also include spectral cameras (multispectral, hyperspectral, etc.). For example, by using a spectral camera, embodiments may obtain a spectral image of a plant that could be used for detection of diseases, understanding Normalized Difference Vegetation Index ("NDVI") values, etc.

Figure 5:
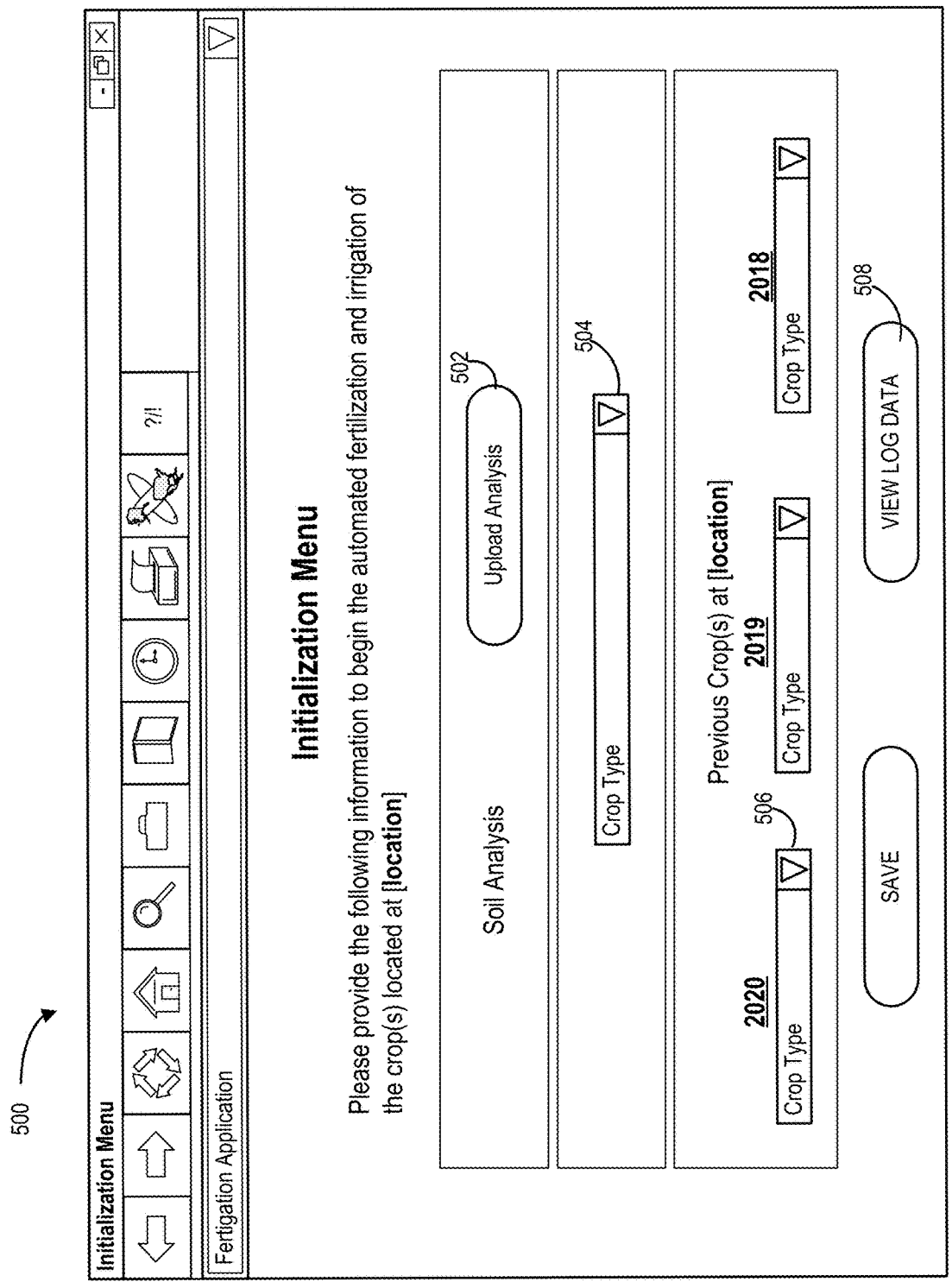
FIG. 5 is a portion of a user interface that may be used with a control system pursuant to some embodiments.

In some embodiments, the system 300 also includes one or more soil chemical composition analyzers. In some embodiments, a soil chemical composition analyzer is used to initialize processing for a given field or area to be fertilized (e.g., the output of such an analyzer may be used as an input to a user interface 500 such as described and shown in conjunction with FIG. 5). A soil chemical composition analyzer may be a hand operated device which generates measurements of a number of elements, including K, Ca, Sc, Ti, V, Cr, Mn, Fe, Co, Ni, Cu, Zn, As, Se, Rb, Sr, Mo, Ag, Cd, Sn, Sb, Ba, Ta, W, Au, Hg, Tl, Pb, Bi, Th, U. Other sensors may be used with the system 300 as described elsewhere herein or to capture additional data beneficial to the determination of fertilizer mixtures pursuant to the present invention.

The microcontroller 302 receives data from the server devices 320 as well as the sensors 322, 324 (including, for example, data associated with the current pH and conductivity of the soil). The microcontroller 302 (operating software such as the analytic software described above) transmits signals to a series of relays 308 to open or close individual ones of a series of valves 310 to cause fertilizers to be dispensed from tanks 312 (containing nitrogen, phosphorous, potash and acid-base) into a mixing tank 330. The microcontroller 302 causes the activation and deactivation of the valves 310 to deliver a calculated amount or proportion of each fertilizer into the mixing tank 330. Once the calculated amount or proportion of each fertilizer is delivered into the mixing tank 330, the microcontroller 302 then causes the fertilizer mix to be deployed into the irrigation system under pressure at a calculated rate that allows delivery of a calculated concentration of the fertilizer mix. For example, the microcontroller 302 may be configured to cause the activation of one or more pumps 328, 332 to control the dispensing of the fertilizer mix into the water 334 for delivery to the irrigation system 336.

Although not shown in FIG. 3, the microcontroller 302 may also be in communication with one or more valves associated with different areas of a field or area to be irrigated (e.g., as described above in conjunction with FIG. 2) in order to provide a targeted deliver of the fertilizer mixture to a specific area of the field or area to be irrigated. In some embodiments, the system 300 may include hydraulic and electric valves.

Pursuant to some embodiments, the machine learning model discussed above may be deployed on (or accessible to) the microcontroller 302. Based on the sensor inputs and other data accessible to the system 300, the machine learning model may make a prediction of the appropriate combination of fertilizer elements to be made for a specific area of application. In some embodiments, the machine learning model may output information identifying the specific combination of elements as well as the appropriate dosage of each to be delivered through the irrigation system. This prediction from the machine learning model may be used to control the operation of the relays 308, the valves 310 and the pumps 328, 332 which cause the dispensing of the fertilizer mix into the water 334 for delivery to the irrigation system 336.

Some of the components of the control system 300 may be deployed at a physical location associated with crops or other plants to be fertilized and irrigated, while some of the components may be deployed at a remote location. For example, in some embodiments, one or more of the server 320, the microcontroller 302, the display 304 and other signals 306 may be deployed at a remote location such as an office or other location configured for use by one or more users to monitor or otherwise interact with one or more control systems 300 pursuant to the present invention. For example, a centralized control location may be provided for one or more operators to interact with one or more control systems 300 at a large farm or other facility. In some embodiments, all of the components of the control system 300 may be deployed at the physical location associated with the crops or other plants to be fertilized and irrigated.

Pursuant to some embodiments, some information about a physical area to be fertilized and irrigated pursuant to the present invention may be uploaded to the control system 300. For example, in some embodiments, a laboratory analysis of the condition of soil in the physical area may be performed to provide information about the soil as of a given point in time. For example, the laboratory analysis may provide information about: (1) the depth of the surface humus horizon (e.g., in centimeters), (2) the level of humus content in the arable layer (as a %), (3) the mobile phosphorous-P2O5 in the arable layer (e.g., in mg/kg), (4) the mobile potassium-K2O in the arable layer (e.g., in mg/kg), (5) the soil density (e.g., in g/cm3), (6) the mechanical composition and soil type, (7) the area (e.g., in hectacres), and (8) the soil acidity level (as pH). The laboratory analysis may also be augmented with specific location information (e.g., such as global positioning coordinates or the like). In some embodiments, such data may be uploaded to a server 320 associated with the control system 300 via a user interface such as the user interface 500 depicted in FIG. 5 (e.g., the soil analysis may be uploaded 502 as a file or may be entered manually).

In some embodiments, the user interface 500 may further prompt the user to enter information 504 identifying the crop to be grown in the location (e.g., the user may be presented with a list of crops in a drop-down menu or the like and the user may select the crop to be grown). The user interface 500 may also prompt the user to enter information 506 associated with crops previously grown at that location (e.g., in the prior growing seasons or years). The user interface 500 may also include a log section 508 or display that shows detailed logs of what actions the control system 300 has taken at the location. For example, the log section may display the most recent fertilizer mixtures and watering details for each section in the location. Details of sensor data at the location may also be viewable through the log section.

Processing by the microcontroller 302 may include determining whether the soil conditions at a location affect the assimilation of certain fertilizer elements. For example, reference is now made to FIG. 6 which depicts information that may be stored in a database at (or accessible to) the microcontroller 302. The information indicates which fertilizer elements do not assimilate give certain soil conditions. Processing by the microcontroller 302 may include rules-based processing to ensure that a fertilizer mixture is not produced which would result in the use of non-assimilating elements.

The microcontroller 302 may further perform processing to determine whether fertilizer elements can be combined. Reference is now made to FIG. 7 which depicts information that may be stored in a database at (or accessible to) the microcontroller 302. The information indicates which fertilizer elements can be mixed together, which elements can be mixed together under certain conditions, and which fertilizer elements cannot be mixed together. Processing by the microcontroller 302 may include rules-based processing to ensure that a fertilizer mixture is not produced which would result in the use of elements that cannot be mixed together under the current conditions.

Application of these data elements and rules allow embodiments to ensure that a fertilizer mixture is created that has a high degree of efficacy and does not use elements that cannot be assimilated or that have undesirable results.

The microcontroller 302 may perform other processing to determine the appropriate mixture of fertilizer components for a given area and a given crop. For example, the microcontroller 302 may perform processing to take into account the achieved yield (for a given crop in the location), climate information and information about natural soil fertility in the area. In practice, most often, the need for nutrients in plants is characterized by their removal. Removal—the amount of nutrients removed from the soil with the actual crop being harvested (for example, grain), including by-products (such as straw), but excluding crop residues remaining in the field (for example, roots and stubble). TABLE I below depicts information associated with the removal of basic food elements with agricultural crops in a harvest.

TABLE I

| CULTURE | MAIN PRODUCTS | HARVEST RELEASE FROM 1 T OF MAIN PRODUCTS AND THE CORRESPONDING AMOUNT OF BY-PRODUCTS, KG | | | | |
|---|---|---|---|---|---|---|
| | | N | P2O5 | K2O | CaO | MgO |
| Silage corn | Green mass | 3.3 | 1.2 | 4.2 | 1.3 | 1 |

The approximate coefficients of using nutrients from soils and fertilizers by corn plants, which can be used to calculate the norms of mineral fertilizers on sod-podzolic and gray forest soils, are given below in TABLE II which shows a portion of a table showing coefficients of utilization of nutrients from soils and fertilizers by plants (for sod-podzolic and gray forest soils), %

TABLE II

| | FROM SOIL (WITH AN AVERAGE NUTRIENT CONTENT AND Above) * | | FROM MINERAL FERTILIZERS IN YEAR 1 | | | FROM ORGANIC FERTILIZERS IN YEAR 1 | | |
|---|---|---|---|---|---|---|---|---|
| CULTURE | P2O5 | K2O | N | P2O5 | K2O | N | P2O5 | K2O |
| Cereals, annuals and perennial grasses | 5 | 10 | 50-60 | 15-25 | 40-50 | 20 | 30 | 40-50 |

* With a low supply of nutrients to the soil, the coefficients increase by 1.5-2 times An example of calculating the rate of application of mineral fertilizers for the planned harvest for winter wheat and corn for silage and sugar beet is shown below in TABLE III.

TABLE III

| | WINTER WHEAT | | | CORN FOR SILOS | | | SUGAR BEET | | |
|---|---|---|---|---|---|---|---|---|---|
| INDICATORS | N | P2O5 | K2O | N | P2O5 | K2O | N | P2O5 | K2O |
| Planned harvest, c/ha | 40 c/ha | | | 400 c/ha | | | 400 c/ha | | |
| Removal of nutrients with the planned yield, kg | 115 | 45 | 80 | 132 | 50 | 168 | 160 | 65 | 260 |
| Used nutrients from the soil | 30 | 15 | 30 | 30 | 15 | 30 | 30 | 15 | 60 |
| Used from 60 t/ha of organic fertilizers, kg | — | — | — | 50 | 25 | 80 | 60 | 30 | 120 |
| Mineral fertilizers required, kg/ha | 85 | 30 | 50 | 55 | 10 | 60 | 100 | 20 | 80 |
| The use of nutrients by plants from mineral fertilizers, % | 65 | 20 | 50 | 65 | 20 | 50 | 65 | 20 | 70 |
| Taking into account the utilization factors, it should be applied with mineral fertilizers, kg/ha of active substance. | 130 | 50 | 100 | 85 | 50 | 120 | 107 | 100 | 115 |
| Application rate for ammonium nitrate kg/ha | 370 | * | * | 245 | * | * | 305 | * | * |

* The application rate (Dvn) for various types of phosphorus and potash fertilizers is calculated in accordance with the content of nutritional elements (E) in them according to the formula: $Dvn = (x * 100)/E$. Where x is the dose by d.v. In general, the formation of high grain yields with favorable quality indicators is largely determined by the system of application of nitrogen fertilizers.

Figure 4:
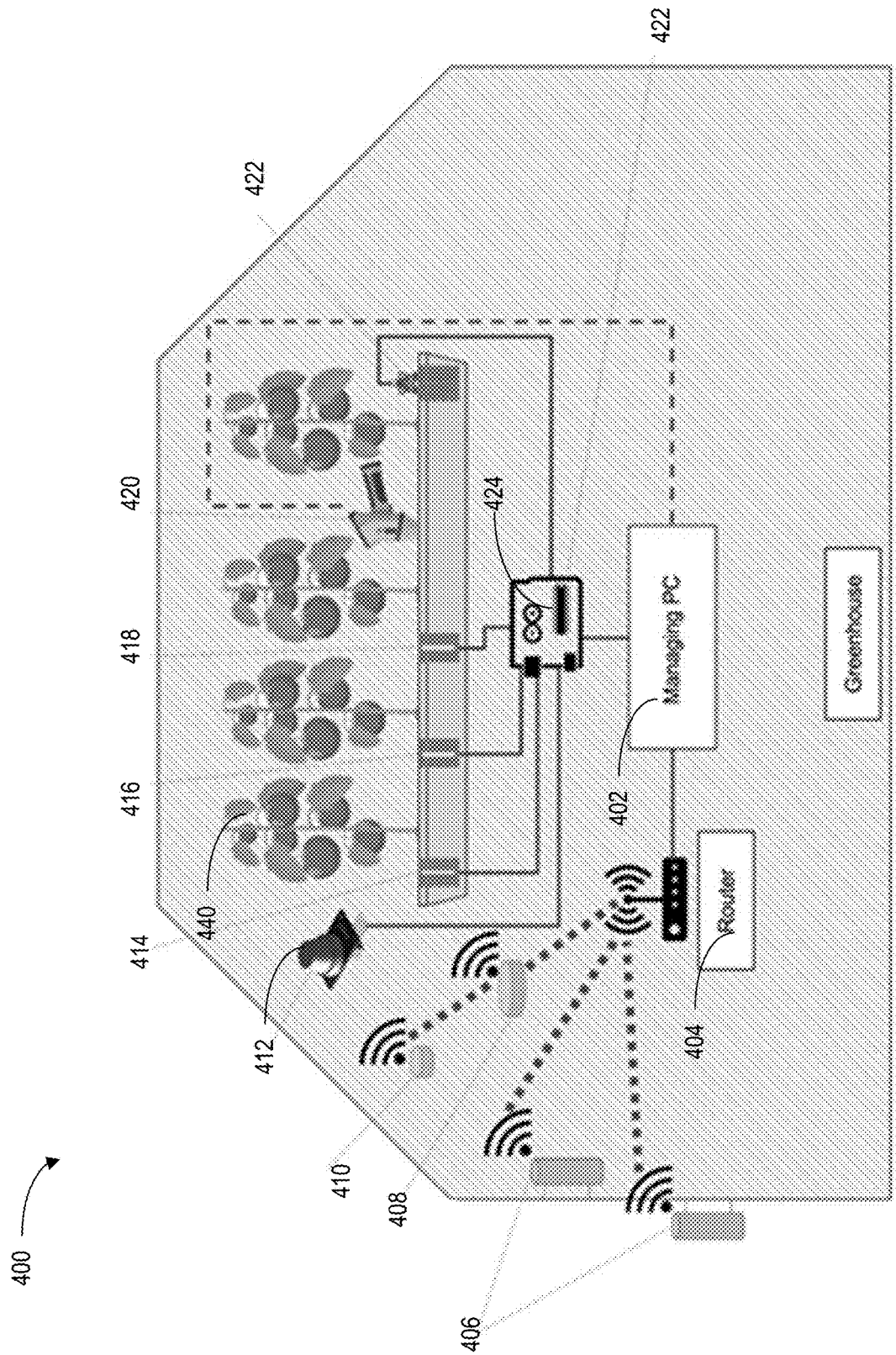
FIG. 4 is a block diagram depicting a system pursuant to some embodiments deployed in a greenhouse.

Pursuant to some embodiments, the present invention may be used in enclosed areas such as greenhouses. An example configuration of such an embodiment will now be described by referring to FIG. 4 in which a system 400 of the present invention is shown deployed in a greenhouse. In the embodiment shown in FIG. 4, the system is controlled by a managing PC or other computer 402 configured to operate as described herein (e.g., the computer 402 may be configured with the computing modules and machine learning model described above in conjunction with FIG. 1). The computer 402 is in communication with a router 404 which is wirelessly in communication with one or more weather stations 406, hubs 408 and light sensors 410. For example, the light sensors 410 may be configured to detect and measure the amount of light at various locations within the greenhouse. The weather stations 406 may be positioned to collect temperature, humidity and other weather data both inside and outside the greenhouse.

The computer 402 may further be in communication with a number of sensors positioned throughout the greenhouse, including, for example, one or more gas sensors 412, one or more EC or conductivity sensors 414, one or more soil temperature sensors 416, one or more pH sensors 418 and one or more humidity sensors 422. Further, the computer 402 may be in communication with a soil analyzer 420 to gather detailed soil analysis information from time to time. In some embodiments, some of the sensors may be in communication with a controller 424 which may automatically control the sensors to gather data. Although not shown in FIG. 4, the system 400 further includes delivery systems 160 which are controlled by the computer 402 to allow fertilizer to be mixed and delivered to locations within the greenhouse pursuant to the present invention. Those skilled in the art, upon reading the present disclosure, will appreciate that other configurations of sensors and other components may be used.

Figure 8:
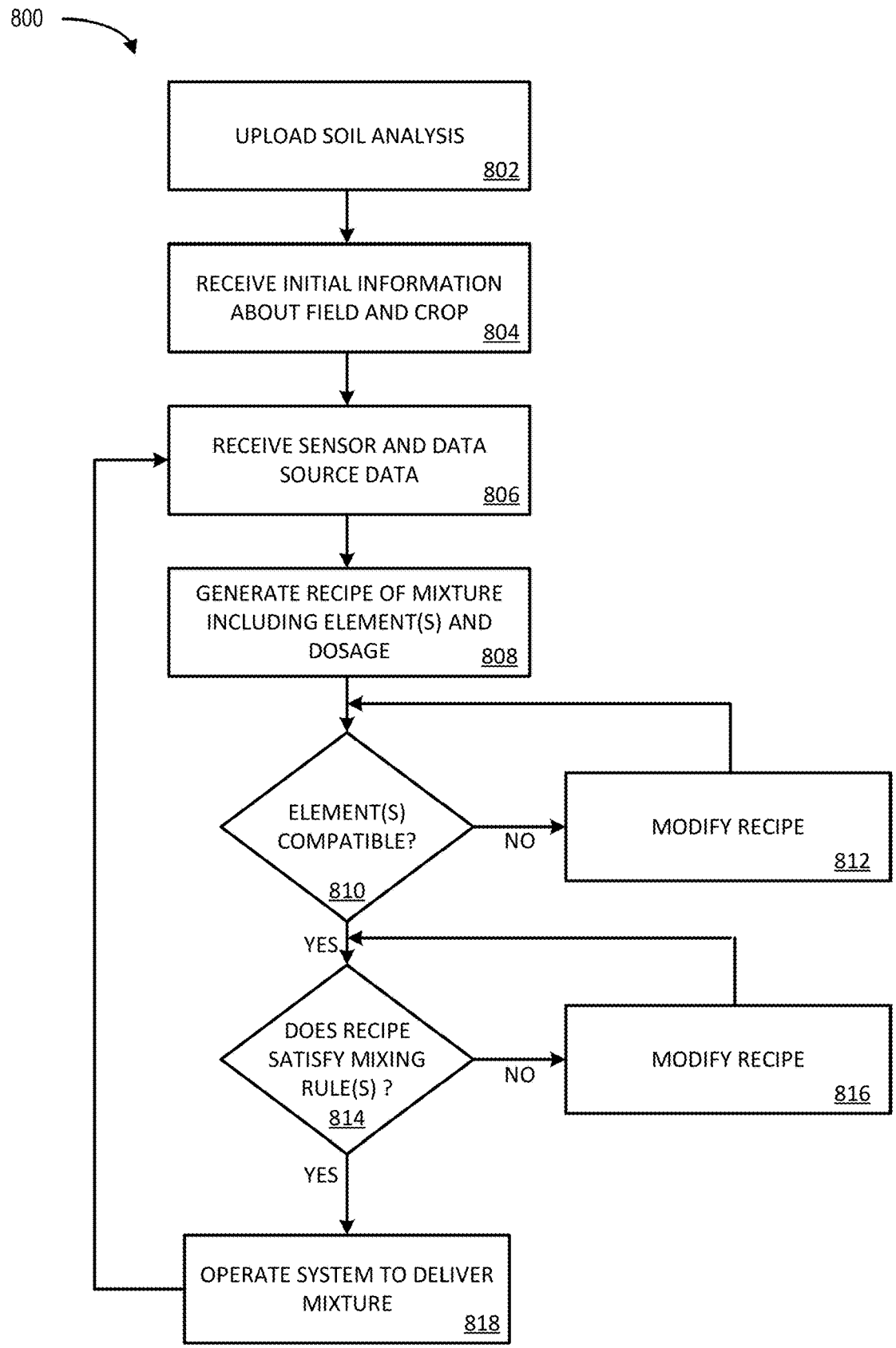
FIG. 8 is a flow diagram depicting a method pursuant to some embodiments.

Pursuant to some embodiments, the systems of the present invention allow the mixture and delivery of targeted fertilizers to be performed substantially automatically. Features of a process pursuant to some embodiments will now be described by reference to FIG. 8. The process 800 of FIG. 8 may be performed, for example, by the platform 110 of FIG. 1 (or the microcontrollers or other devices described elsewhere herein). In some embodiments, some or all of the steps of the process 800 may be performed automatically. In some embodiments, some of the steps of the process 800 may be performed when the platform is initialized for a given area and crop (e.g., at the start of a growing season). In particular, a soil analysis may be uploaded or provided to the platform at 802, and initial information about the field and the crop may be provided at 804. This information at 802 and 804 may be provided in conjunction with an operator interacting with a user interface such as the user interface 500 of FIG. 5 (although those skilled in the art upon reading this disclosure will appreciate that the soil analysis and other information may be automatically obtained or provided in some other fashion).

Once the platform has been initialized for a given field area, processing may continue under the automated control of the platform which may operate to receive sensor and data source data at 806 (e.g., such as from data source 140 and sensor data 150 of FIG. 1 and as described elsewhere herein). For example, the platform may continually (or on a regular basis) receive sensor data providing the platform with information about the current conditions associated with the given field area. The platform may apply one or more processing rules and/or may generate one or more machine learning predictions to determine when a fertilizer mixture should be created, and what that mixture should consist of (given the current conditions of that area and that crop). Processing at 808 includes the platform generating a proposed recipe of a mixture (where the recipe includes information identifying the proposed elements and the proposed dosages of each element).

Processing continues at 810 where a determination is made whether the proposed elements in the recipe are compatible. For example, embodiments may apply one or more compatibility rules (such as those shown in FIG. 7) to determine if the combination is appropriate. If so, processing continues at 814 where a further determination is made whether the proposed recipe satisfies one or more mixing rules (e.g., such as those shown in FIG. 6). If the mixing rules are satisfied, processing may continue at 818 where the platform causes one or more delivery systems to be controlled to create and deliver the mixture pursuant to the recipe.

If processing at 810 and/or 814 indicate that the proposed recipe does not satisfy the compatibility and/or mixing rules, processing may continue at 812 and/or 816 where the platform operates to modify the recipe to satisfy those rules. These modifications may be iterative and may be performed in any order (and may be performed with other rules other than those described herein) to ensure that an appropriate mixture is created and delivered to the target area.

Processing may then repeat at 806 as the platform awaits another fertilization cycle or as the platform analyzes data from other target areas. While this process has generally been described as a single threaded process associated with a single target area, those skilled in the art will appreciate that in practical application, multiple processes may be performed substantially at the same time for multiple target areas. In some embodiments, weather forecast and other environmental parameters may be checked immediately before step 818 (e.g., immediately before the mixture is delivered to the target area), and step 818 may be postponed or modified in the event that weather conditions require it. Although not shown in the process 800, the data collected at 806 may be added to a historical archive of data associated with the target area and the crop, and this historical archive may be used to continue to train and retrain the machine learning model.

Pursuant to some embodiments, the system 100 may further comprise software that performs the function of placing an online order for the components of the mixture to the appropriate supplier and notifies in advance of the need to make an order using a predictive analytics function, specifying the necessary delivery date for the smooth operation of the system 100.

Pursuant to some embodiments, the system 100 may be provided with software that e interacts with specialized neural networks to calculate the optimal composition of the mixture based on historical data, plant data, soil sensors and probes, as well as reference books on the compatibility of fertilizer components in mixtures and reference books on plant nutrition.

Pursuant to some embodiments, the system 100 includes delivery systems 160 configured with replaceable and removable containers-cartridges, which are unified and, if necessary, re-filled containers for rapid replacement of nutrients and auxiliary substances for the continuous operation of the entire complex system.

Pursuant to some embodiments, the system 100 includes replaceable and removable containers-cartridges can contain liquid concentrated mineral fertilizers, amino acids, vitamins, immunomodulators, biofertilizers based on bacterial strains, organic and inorganic acids, chelated metals and which are supplied to the dissolution container with water for subsequent application to plants.

Pursuant to some embodiments, the system 100 includes fillers for replaceable and removable containers-cartridges that are selected from mineral fertilizers, amino acids, vitamins, immunomodulators, biofertilizers based on bacterial strains, organic and inorganic acids, chelated metals in accordance with the type of plant being grown and taking into account the structure of the soil or water environment of the selected field site.

Pursuant to some embodiments, a certain set of amino acids and bacterial strains contained in replaceable and removable containers-cartridges is selected for each cultivated plant type individually, and bacterial strains are symbiotics of this plant species.

Pursuant to some embodiments, the system is provided with a set of replaceable cartridges with nutrients and auxiliary substances for plant growth is from 5 to 18 units, but not less than 5 units, which allows you to use a minimum basic set of nutrients such as nitrogen, phosphorus, potassium, water, oxidizer, to obtain a ready homogeneous mixture and feed to the field site.

Pursuant to some embodiments, the method of fertilization can be a localized irrigation, drip irrigation, sprinkler irrigation, center pivot irrigation, or lateral move irrigation.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

Although a single machine learning model 130 is shown in FIG. 1, any number of such models may be included. Moreover, various devices described herein might be combined according to embodiments of the present invention. The analysis platform 110 (or components thereof) may be implemented by a constellation of networked apparatuses, in a distributed processing or cloud-based architecture.

A user may access the system 100 via one or more devices (e.g., a personal computer, tablet, or smartphone) to view information about and/or manage a digital twin in accordance with any of the embodiments described herein. According to some embodiments, an interactive graphical display interface may let an operator define and/or adjust certain parameters and/or provide or receive automatically generated recommendations or results.

Although specific hardware and data configurations have been described herein, note that any number of other configurations may be provided in accordance with embodiments of the present invention (e.g., some of the information associated with the databases described herein may be combined or stored in external systems).

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

The invention claimed is:

1. A system, comprising:
a memory configured to store data associated with an area to be fertilized, the data including information identifying a crop and soil analysis data associated with the area; and
a processor configured to:
receive sensor data associated with the area, the sensor data including information identifying a current weather condition and a current soil condition for the area;
automatically generate a proposed recipe of a fertilizer mixture including information identifying a combination of elements and a dosage of each of the elements, the proposed recipe being generated by a machine learning model associated with the area, the machine learning model being trained based on a combination of the sensor data and historical data associated with the area, executing with inputs including at least the current weather condition and the current soil condition, and generating a prediction specifically for the area including predictions for an optimized flow rate to deliver a mixture of the fertilizer mixture and water to the area and the crop by a delivery system;

determine whether the proposed recipe satisfies at least a first rule requiring that each of the elements of the proposed recipe are compatible;

determine whether the proposed recipe satisfies at least a second rule requiring that the proposed recipe complies with at least a first mixing rule that specifies whether the elements of the proposed recipe can be assimilated in the current soil condition; and in an instance the proposed recipe satisfies both the at least first rule and the at least second rule, operate the delivery system, in accordance with the predictions for the optimized flow rate generated by the machine learning model, to automatically deliver the mixture of the fertilizer mixture and water to the area.

2. The system of claim 1, wherein the determining whether the proposed recipe satisfies the at least first rule results in a determination that the proposed recipe does not satisfy the at least first rule, wherein the processor is further configured to:

automatically modify the proposed recipe so that the proposed recipe satisfies the at least first rule.

3. The system of claim 1, wherein the operating of the delivery system to deliver the mixture of the fertilizer mixture and water to the area further comprises:

activating at least a first valve to cause the dosage of each of the elements to be mixed in a mixing tank; and releasing a resulting mixture from the mixing tank into an irrigation system.

4. The system of claim 3, wherein the releasing of the resulting mixture from the mixing tank into the irrigation system further comprises releasing the resulting mixture under pressure at a calculated rate to achieve a desired concentration of the resulting mixture.

5. The system of claim 1, wherein the soil analysis data associated with the area includes information identifying at least one of (i) depth of a surface humus horizon, (ii) level of humus content in an arable layer, (iii) amount of mobile phosphorous in the arable layer, (iv) amount of mobile potassium in the arable layer, (v) density of the soil, (vi) a mechanical composition and soil type of the area, (vii) size of the area, and (viii) soil acidity level (pH) of the area.

6. The system of claim 1, wherein the proposed recipe includes at least one of (i) a quantity of a nitrogen fertilizer, (ii) a quantity of a phosphorous fertilizer, and (iii) a quantity of a potash fertilizer.

7. The system of claim 6, wherein the quantity of a fertilizer is calculated based at least in part on (i) information identifying a planned yield of the crop for the area, (ii) information identifying a humus content of the soil in the area, (iii) historical information associated with previous crops and doses of fertilizers in the area.

8. The system of claim 4, wherein the calculated rate is calculated based at least in part on electrical conductivity of water in the irrigation system.

9. The system of claim 8, wherein the electrical conductivity is increased or decreased by modifying the calculated rate.

10. The system of claim 3, wherein the processor is further configured to activate at least the first valve to cause the irrigation system to deliver the mixture of the fertilizer mixture and water to the area.

11. The system of claim 3, wherein the processor is further configured to analyze the current weather condition prior to releasing the resulting mixture from the mixing tank into the irrigation system.

12. The system of claim 1, wherein the system further comprises a display, wherein the processor is further configured to cause a user interface to be presented on the display, the user interface prompting a user to upload the soil analysis data associated with the area.

* * * * *